United States Patent
Tomiyoshi (10) Patent No.: US 10,704,519 B2
(45) Date of Patent: Jul. 7, 2020

(54) CONTROL DEVICE OF HYBRID VEHICLE

(71) Applicant: TOYOTA JIDOSHA KABUSHIKI KAISHA, Aichi-ken (JP)

(72) Inventor: Kimihiko Tomiyoshi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/233,099

(22) Filed: Dec. 27, 2018

(65) Prior Publication Data
US 2019/0257279 A1 Aug. 22, 2019

(30) Foreign Application Priority Data

Feb. 22, 2018 (JP) .................. 2018-029663

(51) Int. Cl.
| | |
|---|---|
| *F02N 11/08* | (2006.01) |
| *F02D 41/24* | (2006.01) |
| *F02D 41/08* | (2006.01) |
| *F02D 41/04* | (2006.01) |
| *B60W 20/16* | (2016.01) |

(52) U.S. Cl.
CPC ......... *F02N 11/0829* (2013.01); *B60W 20/16* (2016.01); *F02D 41/042* (2013.01); *F02D 41/08* (2013.01); *F02D 41/2429* (2013.01); *F02N 2200/022* (2013.01)

(58) Field of Classification Search
CPC ........... F02N 11/0829; F02N 2200/022; F02D 41/042; F02D 41/08; F02D 41/2429; B60W 20/16
USPC ....................................................... 701/112
See application file for complete search history.

(56) References Cited

U.S. PATENT DOCUMENTS

| | | | |
|---|---|---|---|
| 2009/0319158 A1* | 12/2009 | Ando | B60K 1/02 701/106 |
| 2010/0036590 A1* | 2/2010 | Nakai | F02D 41/042 701/112 |
| 2012/0239280 A1* | 9/2012 | Kobayashi | F02D 41/0097 701/113 |
| 2013/0261859 A1* | 10/2013 | Sugimoto | B60W 20/40 701/22 |

(Continued)

FOREIGN PATENT DOCUMENTS

| | | |
|---|---|---|
| JP | 2009-40234 A | 2/2009 |
| JP | 2010-236516 A | 10/2010 |

*Primary Examiner* — Mahmoud Gimie
(74) *Attorney, Agent, or Firm* — Hauptman Ham, LLP (57) ABSTRACT

Provided is a control device of a hybrid vehicle powered by an internal-combustion engine and a motor, wherein a catalyst that purifies exhaust gas is located in an exhaust passage of the internal-combustion engine, and the control device comprises: a learning unit configured to, during operation of the internal-combustion engine, learn a parameter for controlling a rotation speed of the internal-combustion engine so that a rotation speed of the internal-combustion engine during idling operation is equal to a target rotation speed; and a controller configured to stop the internal-combustion engine when a state where a correction amount of the parameter to cause the rotation speed during idling operation to be equal to the target rotation speed is equal to or greater than a predetermined value continues for equal to or greater than a predetermined time period, the correction amount being obtained by learning by the learning unit.

6 Claims, 8 Drawing Sheets

(56) References Cited

U.S. PATENT DOCUMENTS

2014/0379239 A1* 12/2014 Ohmura ................ F02D 41/062
  701/103
2015/0020773 A1* 1/2015 Tsukada ................ F02D 41/042
  123/376

* cited by examiner

FIG. 8B

CONTROL DEVICE OF HYBRID VEHICLE

CROSS-REFERENCE TO RELATED APPLICATION

This application is based upon and claims the benefit of priority of the prior Japanese Patent Application No. 2018-029663, filed on Feb. 22, 2018, the entire contents of which are incorporated herein by reference.

FIELD OF THE INVENTION

The present disclosure relates to a control device of a hybrid vehicle.

BACKGROUND

There have been known hybrid vehicles including an internal-combustion engine (an engine) and a motor as a drive source of the vehicle. In the hybrid vehicle, a drive mode using only an engine, a drive mode using only a motor, and a drive mode using both the engine and the motor can be switched. In such hybrid vehicles, intermittent operation during which the stop and the start of the engine are repeated is executed in accordance with the travelling state of the vehicle.

Also in the hybrid vehicle, a learning control of the engine is executed. For example, the idle speed control (ISC) that makes the rotation speed of the engine during idling operation (the idling speed) equal to a target rotation speed is executed. For example, the ISC learning that learns the opening degree of a throttle valve (the throttle opening degree) during the operation of the engine and reflects the obtained value to the throttle opening degree is executed, as disclosed in, for example, Japanese Patent Application Publication No. 2009-040234.

SUMMARY OF THE INVENTION

It is therefore an object of the present disclosure to provide a control device of a hybrid vehicle capable of inhibiting rise in temperature of a catalyst.

The above object is achieved by a control device of a hybrid vehicle powered by an internal-combustion engine and a motor, wherein a catalyst that purifies exhaust gas is located in an exhaust passage of the internal-combustion engine, and the control device includes: a learning unit configured to, during operation of the internal-combustion engine, learn a parameter for controlling a rotation speed of the internal-combustion engine so that a rotation speed of the internal-combustion engine during idling operation is equal to a target rotation speed; and a controller configured to stop the internal-combustion engine when a state where a correction amount of the parameter to cause the rotation speed during idling operation to be equal to the target rotation speed is equal to or greater than a predetermined value continues for equal to or greater than a predetermined time period, the correction amount being obtained by learning by the learning unit.

When the state where the correction amount is equal to or greater than the predetermined value continues for equal to or greater than the predetermined time period, the controller may be configured to cause the internal-combustion engine to execute intermittent operation during which a stop and operation are repeated.

When the state where the correction amount is equal to or greater than the predetermined value continues for equal to or greater than the predetermined time period, the learning unit may be configured not to execute the learning.

The controller may be configured to stop the internal-combustion engine when duration of an upper limit guard control of the correction amount is equal to or greater than the predetermined time period.

A throttle valve may be located in an intake passage of the internal-combustion engine, and the parameter may be an opening degree of the throttle valve.

The internal-combustion engine may include an EGR passage that recirculates exhaust gas from the exhaust passage to an intake passage of the internal-combustion engine.

DETAILED DESCRIPTION

The ISC learning is executed while the engine is operating, but is not executed while the engine is stopped. That is, the ISC learning is not executed during the intermittent operation during which the stop and the restart of the engine are repeated. In other words, during execution of the ISC learning, the engine cannot shift to the intermittent operation, and does not stop.

Due to the deterioration in the combustion state of the engine, it may be difficult to control the rotation speed even by the ISC learning. In this case, since the ISC learning is not completed, the engine does not shift to the intermittent operation, and continues to drive. When the engine in a bad combustion state drives, unburned gas is emitted from the engine. When such unburned gas burns in a catalyst in the exhaust passage, the temperature of the catalyst greatly rises.

Embodiment

Figure 1:
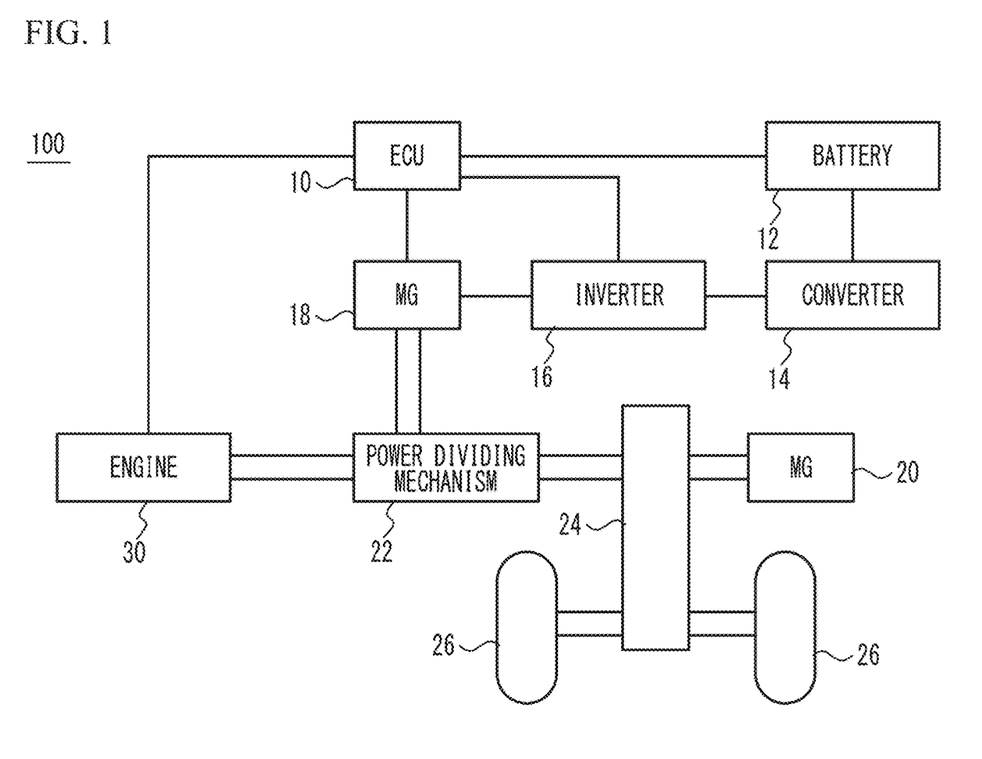
FIG. 1 is a block diagram illustrating a hybrid system.

Hereinafter, with reference to the attached drawings, a control device of a hybrid vehicle in accordance with a present embodiment will be described. FIG. 1 is a block diagram illustrating a hybrid system 100. The hybrid system 100 is installed on a hybrid vehicle, and includes an electric control unit (ECU) 10, a battery 12, a converter 14, an inverter 16, a motor generator (MG) 18, a motor generator (MG) 20, a power dividing mechanism 22, a reducer 24, driving wheels 26, and an engine 30.

The ECU 10 includes a Central Processing Unit (CPU), a Random Access Memory (RAM), a Read Only Memory (ROM), a storage device, and the like, and executes various controls by executing programs stored in the ROM or the storage device. The ECU 10 controls the operating state of the MGs 18 and 20, the charging and discharging of the battery 12, and the operating state of the engine 30. The ECU 10 functions as a learning unit that executes the ISC learning, and as a controller that controls the distribution of the power between the engine 30 and the motors (the MGs 18 and 20) and stops the engine 30. Although the ECU 10 is illustrated in FIG. 1, the hybrid system 100 may include both an engine ECU that controls the engine 30 and an MG_ECU that controls the MGs 18 and 20 and the charging and discharging of the battery 12.

The engine 30 and the MG 20 function as a power source for the vehicle, and the MG 20 is used when the engine 30 is started, for example. The MG 18 functions as a power generator for charging the battery 12.

The power dividing mechanism 22 transmits the drive force of the engine 30 and the MG 20 to the reducer 24. The distribution of the power of the engine 30 and the power of the MG 20 is changed by the power dividing mechanism 22 as desired. The power dividing mechanism 22 is composed of, for example, a planetary gear including a sun gear, a planetary carrier, and a ring gear.

When the MG 18 or 20 functions as a motor, the direct-current (DC) power discharged from the battery 12 is increased by the converter 14, and is then converted into alternate-current (AC) power by the inverter 16. The AC power is supplied to the MG 18 or the MG 20.

When the battery 12 is charged, the MG 18 or 20 functions as a generator. The AC power generated by the MG 18 or 20 is converted into DC power by the inverter 16, is decreased by the converter 14, and is then supplied to the battery 12.

Engine

Figure 2:
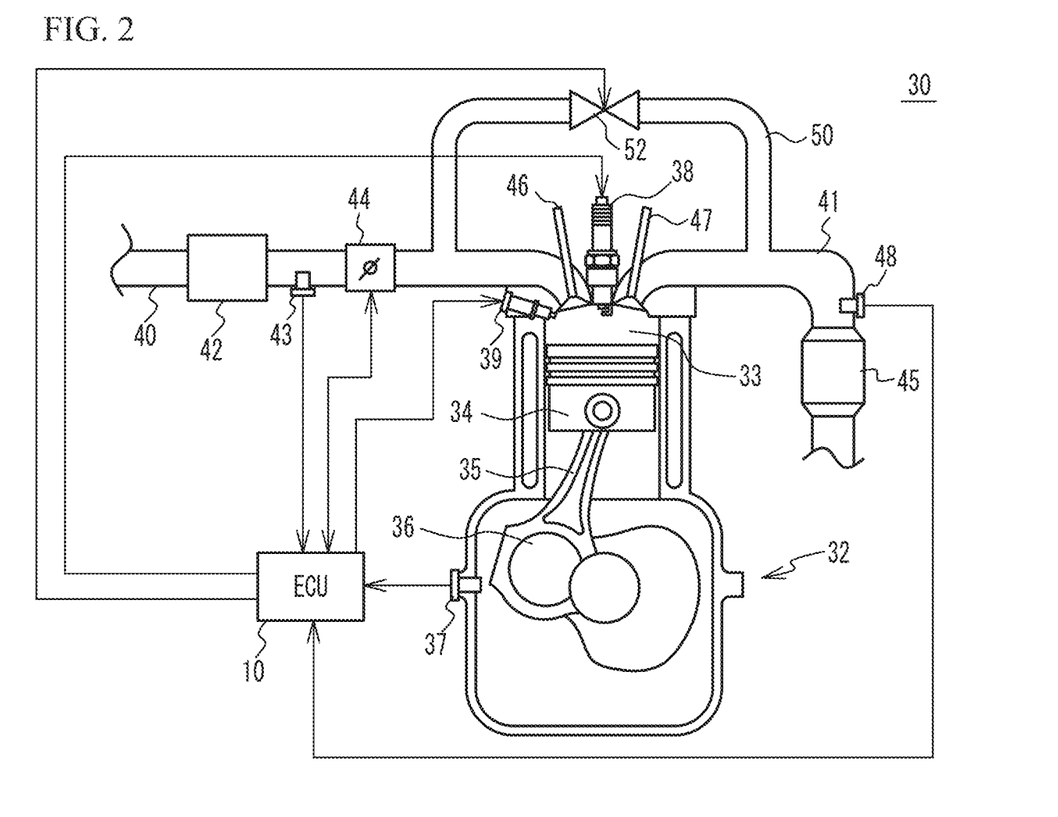
FIG. 2 is a schematic view illustrating an engine.

FIG. 2 is a schematic view illustrating the engine 30. As illustrated in FIG. 2, a combustion chamber 33 is formed inside an engine body 32 of the engine 30. A piston 34, a connecting rod 35, and a crankshaft 36 are arranged inside the engine body 32. The piston 34 is connected to the crankshaft 36 by the connecting rod 35. In the engine body 32, a rotation speed sensor 37, a spark plug 38, and a fuel injection valve 39 are provided. The rotation speed sensor 37 detects the rotation speed of the engine 30. The fuel injection valve 39 supplies fuel to the combustion chamber 33 (cylinder injection). The spark plug 38 ignites air-fuel mixture in the combustion chamber 33. The fuel injection valve 39 may be located in an intake passage 40, and may execute port injection.

The intake passage 40 and an exhaust passage 41 are connected to the engine body 32. The rotation of a camshaft (not illustrated) opens and closes an intake valve 46 and an exhaust valve 47.

An air cleaner 42, an air flow meter 43, and a throttle valve 44 are arranged in the intake passage 40 from the upstream side to the downstream side. The air cleaner 42 removes dust from air flowing from the outside. The air flow meter 43 obtains an intake air amount. The throttle valve 44 is driven by, for example, an actuator, which is not illustrated, and adjusts the intake air amount. As the opening degree of the throttle valve 44 increases, the intake air amount increases, while as the opening degree decreases, the intake air amount decreases.

When the intake valve 46 opens, air is introduced from the intake passage 40 into the combustion chamber 33. The fuel injected from the fuel injection valve 39 and air form air-fuel mixture. The air-fuel mixture is compressed by the piston 34, and is then ignited by the spark plug 38. The firing causes the piston 34 to reciprocate in the vertical direction in the combustion chamber 33, and the crankshaft 36 thereby rotates. Exhaust gas after combustion is discharged from the exhaust passage 41.

A catalyst 45 and an air-fuel ratio sensor 48 are located in the exhaust passage 41. The catalyst 45 is, for example, a ternary catalyst, contains catalyst metals such as platinum (Pt), palladium (Pd), rhodium (Rh), and the like, has an oxygen storage capacity, and cleans up NOx, HC, and CO. The air-fuel ratio sensor 48 detects an air-fuel ratio.

A first end of an exhaust gas recirculation (EGR) passage 50 is coupled to the exhaust passage 41, and a second end of the EGR passage 50 is coupled to the intake passage 40. An EGR valve 52 is located in the EGR passage 50. A part of exhaust gas (EGR gas) flows into the intake passage 40 through the EGR passage 50, and is introduced into the combustion chamber 33 again. As the opening degree of the EGR valve 52 increases, the flow rate of the EGR gas increases, and as the opening degree decreases, the flow rate of the EGR gas decreases. An EGR cooler, which cools the EGR gas, may be provided in the EGR passage 50, for example.

The ECU 10 adjusts the ignition timing of the spark plug 38, the injection amount of fuel and the injection timing of fuel from the fuel injection valve 39, and the opening degrees of the throttle valve 44 and the EGR valve 52. Input to the ECU 10 are the rotation speed detected by the rotation speed sensor 37, the intake air amount detected by the air flow meter 43, and the air-fuel ratio detected by the air-fuel ratio sensor 48.

The ECU 10 executes the ISC learning control during idling operation of the engine 30. That is, the ECU 10 feedback-controls the intake air amount so that the rotation speed during the idling operation is equal to the target rotation speed. More specifically, the ECU 10 calculates a target intake air amount based on the difference between the target rotation speed and the rotation speed. The ECU 10 converts the target intake air amount into the throttle opening degree to obtain the correction amount of the throttle opening degree. For example, when the rotation speed is less than the target rotation speed, the correction amount is determined so that the throttle opening degree increases. When the rotation speed is greater than the target rotation speed, the correction amount is determined so that the throttle opening degree decreases. The ECU 10 stores the correction amount as a learning value, and feedback-controls the throttle valve 44 based on the learning value. The total correction amount described later is the amount based on the sum of the correction amount and the learning value, and is calculated by the ECU 10.

However, deterioration in the combustion state in the engine 30 may make it difficult to control the rotation speed to be equal to the target rotation speed by the ISC learning. In particular, in the idling state, the negative pressure in the combustion chamber is large. Thus, the flow rate of the EGR gas from the EGR passage 50 increases, and thereby, the combustion state further deteriorates. In this case, the rotation speed is not controlled to be within the target range, the ISC learning is not completed, and the engine 30 continues to drive. Misfire of the engine 30 in a bad combustion state causes unburned gas to be emitted from the engine 30. The unburned gas is discharged from the combustion chamber 33 to the exhaust passage 41, and may burn near the catalyst 45. As a result, the temperature of the catalyst 45 greatly increases. The present embodiment inhibits rise in temperature of the catalyst 45 associated with an anomaly of the ISC learning.

Control

FIG. 3 through FIG. 7 are flowcharts illustrating controls executed by the ECU 10. FIG. 3 through FIG. 6 illustrate the ISC-OBD (On Board Diagnosis) control for determining whether the ISC learning is abnormal. Conditions A through C mentioned in FIG. 3 will be described later. The ECU 10 determines whether the condition A is satisfied (step S10). When the determination is No, the control ends. When the determination is Yes, the ECU 10 determines whether the condition B is satisfied (step S12). When the determination is No, the ECU 10 determines whether the condition C is satisfied (step S14). When the determination is No, the control ends. When the determination is Yes at any one of steps S12 and S14, the ECU 10 sets an abnormal flag that indicates that the ISC learning is abnormal (step S16). After step S16, the control ends.

Figure 4:
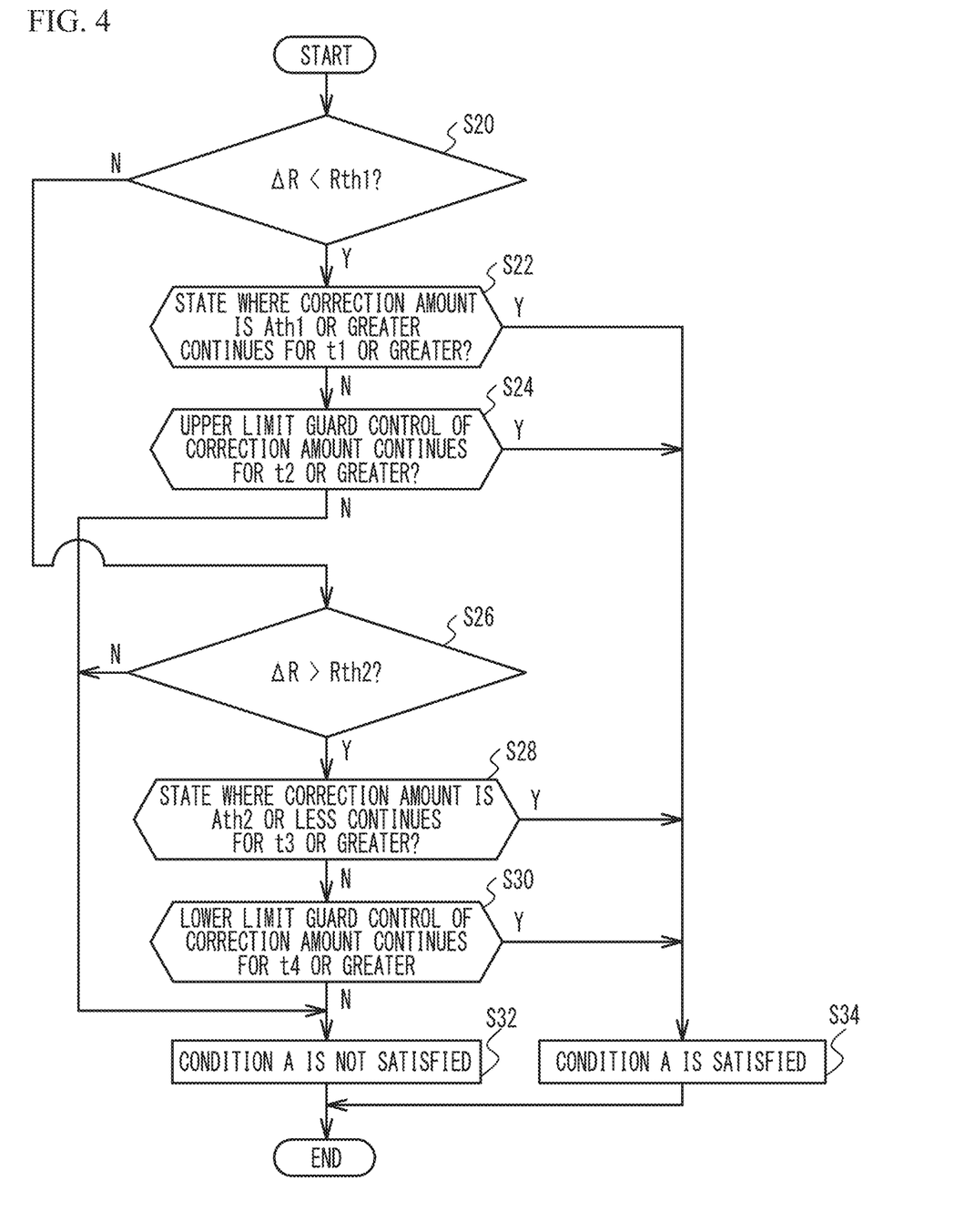
FIG. 4 is a flowchart illustrating a control executed by the ECU.

FIG. 4 illustrates a control for determining whether the condition A is satisfied. As illustrated in FIG. 4, the ECU 10 obtains the difference ΔR between the rotation speed and the target rotation speed, and determines whether ΔR is less than a threshold value Rth1 (step S20). When the determination is Yes, the ECU 10 determines whether the state where the correction amount in the ISC learning is equal to or greater than a threshold value Ath1 continues for a time period t1 or greater (step S22). When the determination is No, the ECU 10 determines whether an upper limit guard control of the correction amount continues for a time period t2 or greater (step S24). The upper limit guard control is a control that limits the correction amount by an upper limit guard value. During the upper limit guard control, the correction amount may reach the upper limit guard value, but does not exceed the upper limit guard value. When the determination is No at step S24, the ECU 10 determines that the condition A is not satisfied (step S32). On the other hand, when the determination is Yes at step S22 or S24, the ECU 10 determines that the condition A is satisfied (step S34).

When the determination is No at step S20, the ECU 10 determines whether the difference ΔR between the rotation speed and the target rotation speed is greater than the threshold value Rth2 (step S26). When the determination is Yes, the ECU 10 determines whether the state where the correction amount is equal to or less than the threshold value Ath2 continues for a time period t3 or greater (step S28). When the determination is No, the ECU 10 determines whether a lower limit guard control of the correction amount continues for a time period t4 or greater (step S30). The lower limit guard control is a control that limits the correction amount by a lower limit guard value. During the lower limit guard control, the correction amount may reach the lower limit guard value, but does not go below the lower limit guard value. When the determination is No at step S30 or S26, the ECU 10 determines that the condition A is not satisfied (step S32). On the other hand, when the determination is Yes at step S28 or S30, the ECU 10 determines that the condition A is satisfied (step S34). After step S32 or S34, the control in FIG. 4 ends. The ECU 10 counts the number of times that the condition A is satisfied.

Figure 5:
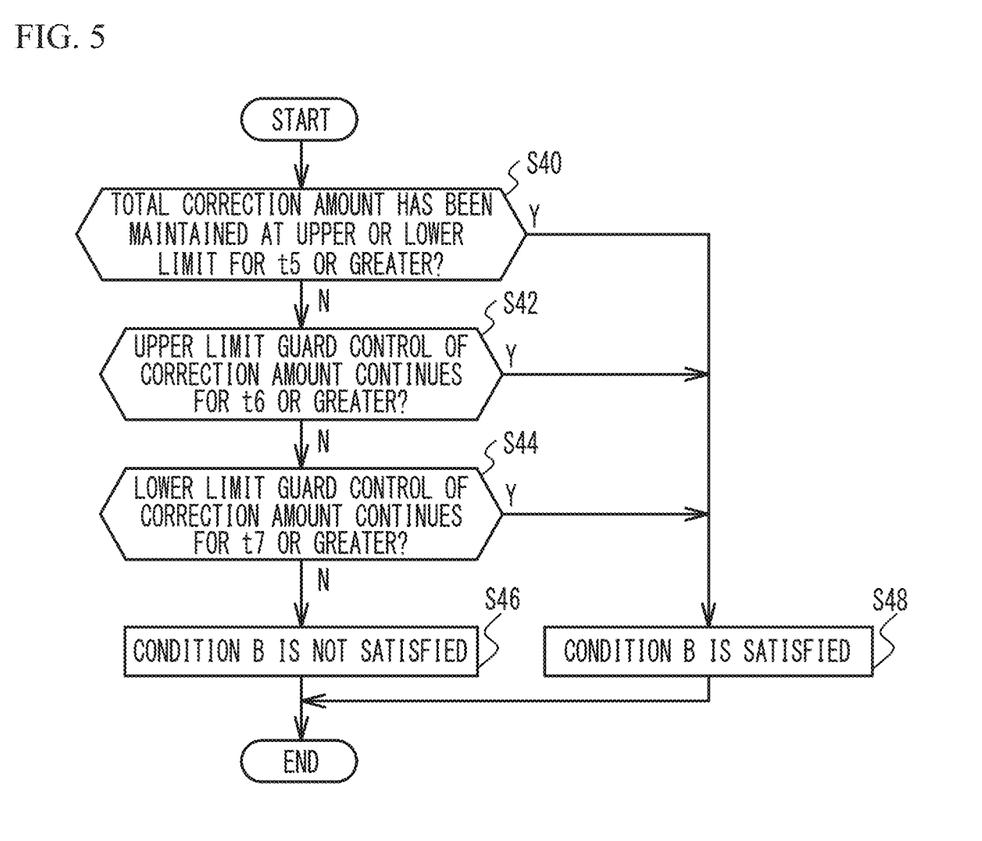
FIG. 5 is a flowchart illustrating a control executed by the ECU.

FIG. 5 illustrates a control for determining whether the condition B is satisfied. As illustrated in FIG. 5, the ECU 10 determines whether the total correction amount has been maintained at the upper limit or the lower limit for a time period t5 or greater (step S40). When the total correction amount has been maintained at the upper limit or the lower limit, it means that the state where the total correction amount is equal to the upper limit or equal to the lower limit continues. The upper limit may be, for example, the upper limit guard value, or other values. The lower limit may be, for example, the lower limit guard value, or other values.

When the determination is No, the ECU 10 determines whether the upper limit guard control of the correction amount continues for a time period t6 or greater (step S42).

When the determination is No, the ECU 10 determines whether the lower limit guard control of the correction amount continues for a time period t7 or greater (step S44). When the determination is No, the ECU 10 determines that the condition B is not satisfied (step S46). When the determination is Yes at any one of steps S40, S42, and S44, the ECU 10 determines that the condition B is satisfied (step S48). After step S46 or S48, the control ends.

Figure 6:
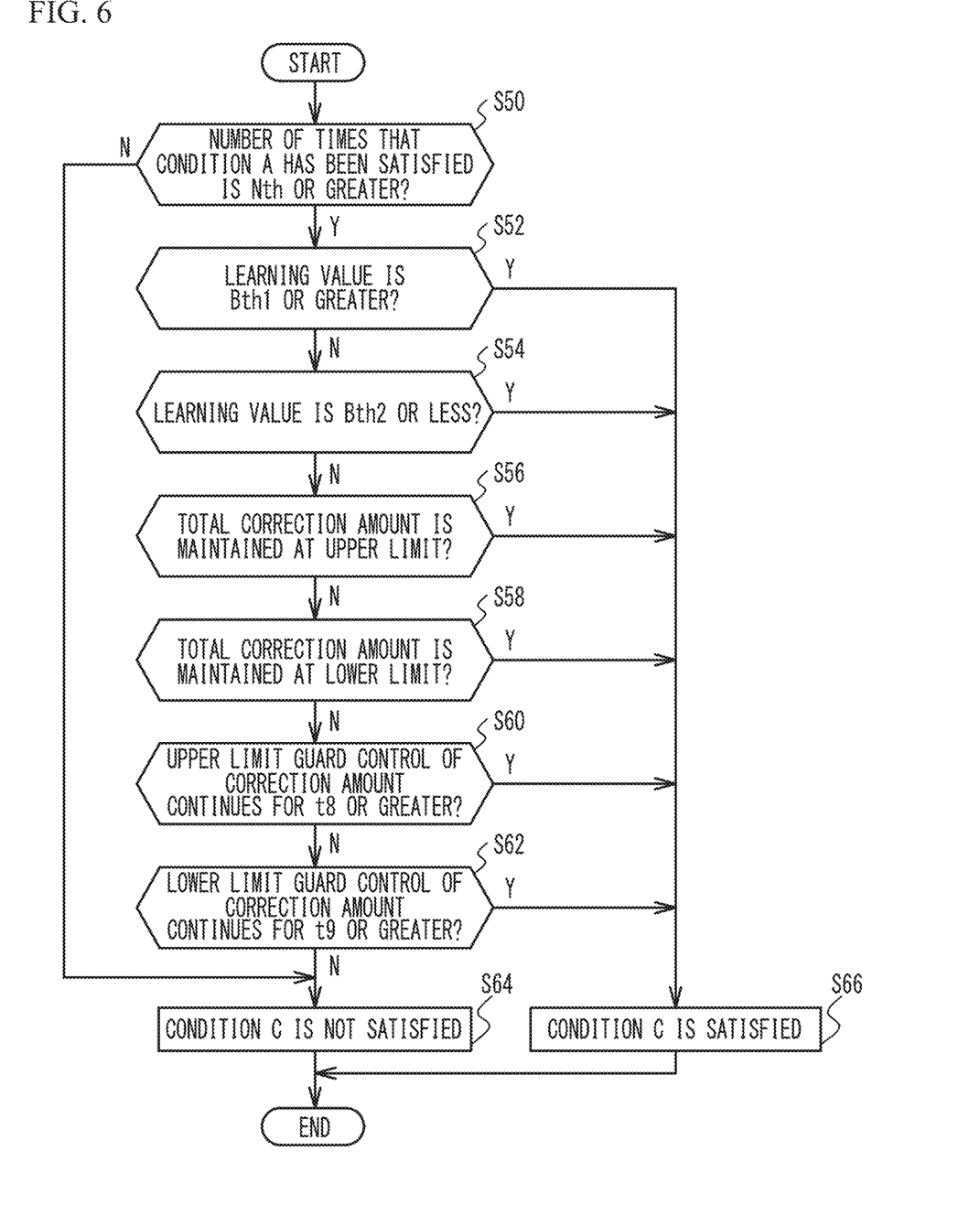
FIG. 6 is a flowchart illustrating a control executed by the ECU.

FIG. 6 illustrates a control for determining whether the condition C is satisfied. As illustrated in FIG. 6, the ECU 10 determines whether the number of times that the condition A has been satisfied is equal to or greater than a predetermined number of times Nth (step S50). When the determination is No, the ECU 10 determines that the condition C is not satisfied (step S64).

When the determination is Yes at step S50, the ECU 10 determines whether the learning value that has been updated by the ISC learning is equal to or greater than a predetermined value Bth1 (step S52). When the determination is No, the ECU 10 determines whether the updated learning value is equal to or less than a predetermined value Bth2 (step S54). When the determination is No, the ECU 10 determines whether the total correction amount is maintained at the upper limit (step S56). When the determination is No, the ECU 10 determines whether the total correction amount is maintained at the lower limit (step S58).

When the determination is No, the ECU 10 determines whether the upper limit guard control of the correction amount continues for a time period t8 or greater (step S60). When the determination is No, the ECU 10 determines whether the lower limit guard control of the correction amount continues for a time period t9 or greater (step S62). When the determination is No at step S62, the ECU 10 determines that the condition C is not satisfied (step S64). On the other hand, when the determination is Yes at any one of steps S52 through S62, the ECU 10 determines that the condition C is satisfied (step S66). After step S64 or S66, the control ends.

Figure 3:
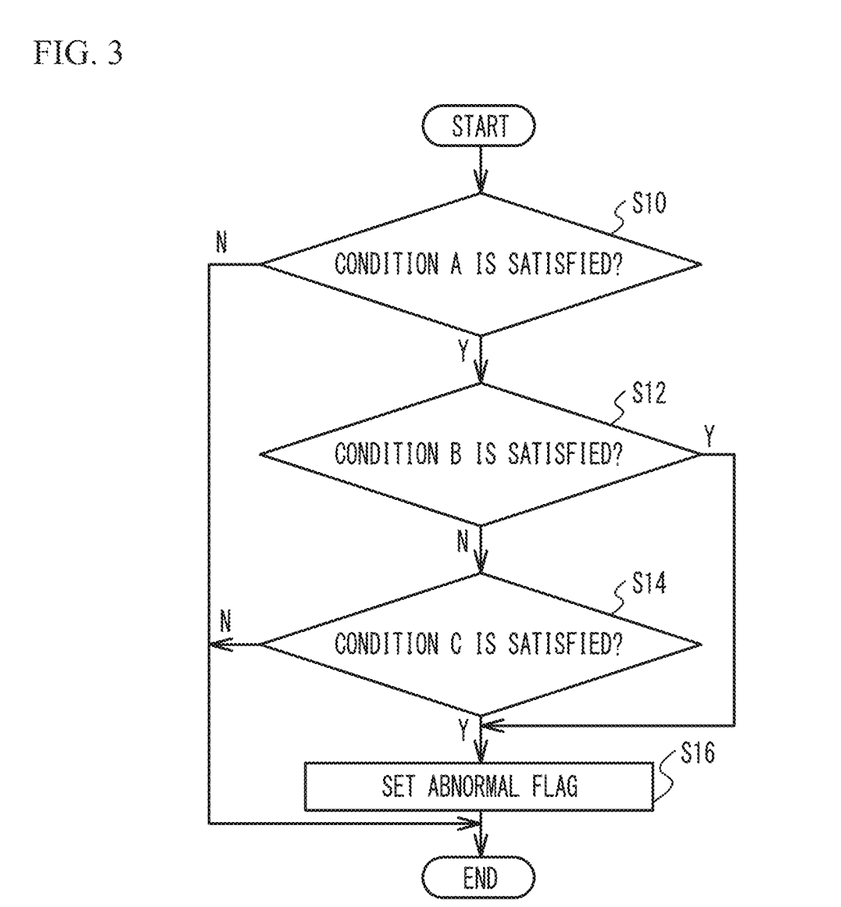
FIG. 3 is a flowchart illustrating a control executed by an ECU.

When it is determined that the condition A is satisfied and the condition B or C is satisfied by the above controls in FIG. 4 through FIG. 6, the ECU 10 sets an abnormal flag as illustrated in FIG. 3 (step S16). Thereafter, the ECU 10 executes a control illustrated in FIG. 7.

Figure 7:
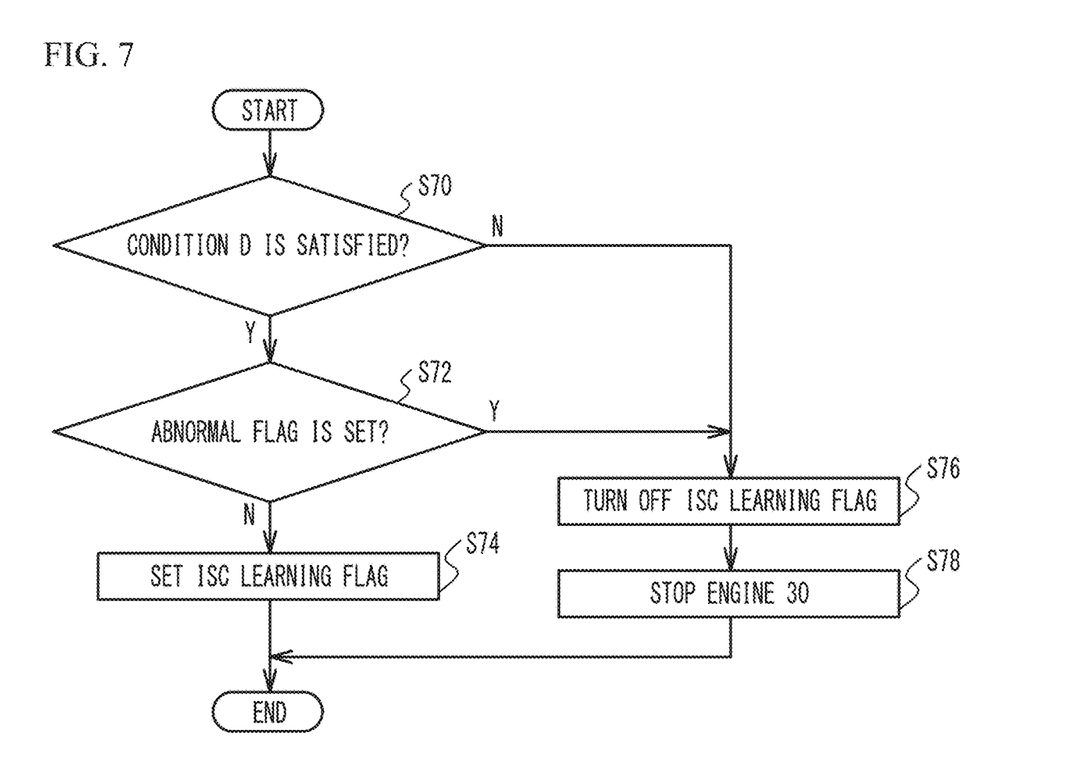
FIG. 7 is a flowchart illustrating a control executed by the ECU.

FIG. 7 illustrates a control for determining whether the ISC learning is to be executed. The ECU 10 determines whether a predetermined condition D is satisfied (step S70). When the determination is Yes, the ECU 10 determines whether the abnormal flag is set (step S72). When the determination is No, the ECU 10 sets the ISC learning flag (step S74). In this case, the ISC learning is executed.

On the other hand, when the determination is No at step S70 or when the determination is Yes at step S72, the ECU 10 turns off the ISC learning flag (step S76), and stops the operation of the engine 30 (step S78). More specifically, the ECU 10 causes the engine 30 not to continue to operate, and causes the engine 30 to shift to the state of the intermittent operation during which the stop and the operation are repeated. In this case, the ISC learning is not executed. In addition, when the operation of the engine 30 stops, the inflow of air to the combustion chamber 33, the fuel injection, and the ignition also stop. As a result, combustion deterioration and generation of unburned gas are inhibited. After step S74 or S78, the control ends.

Figure 8A:
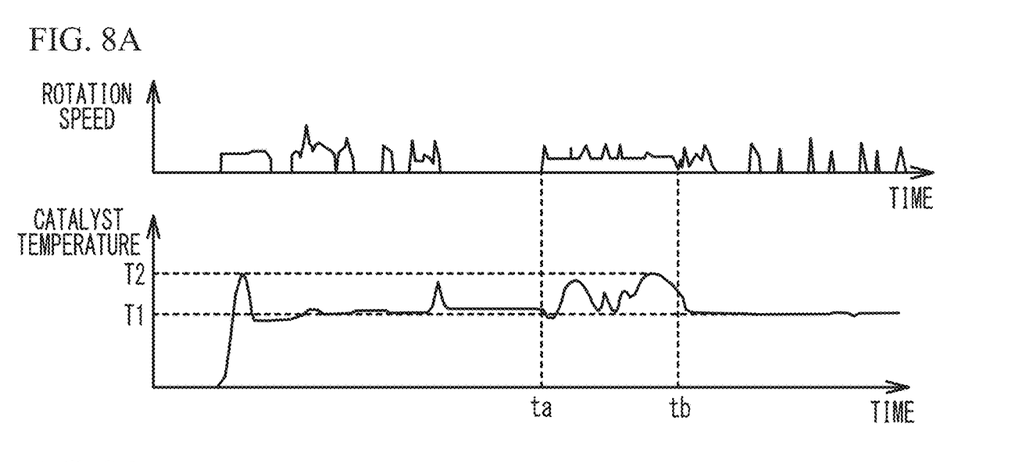
FIG. 8A and FIG. 8B are time charts illustrating the rotation speed and the temperature of a catalyst.
Figure 8B:
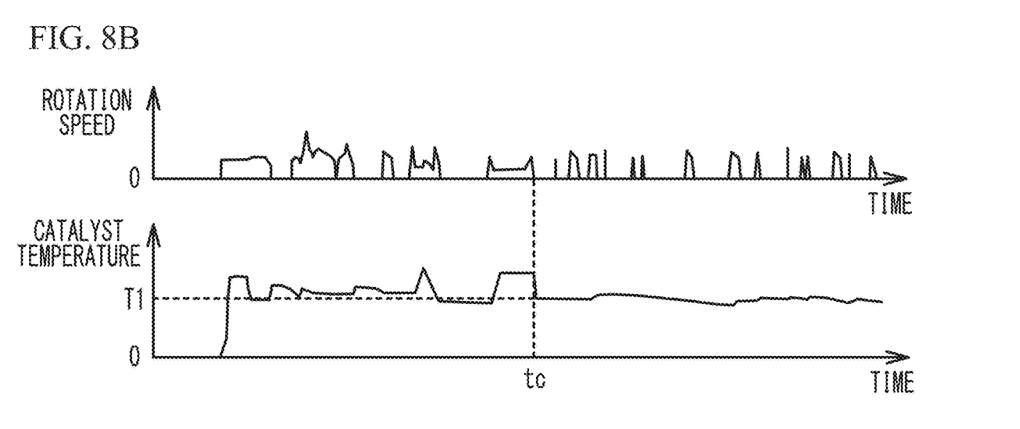

FIG. 8A and FIG. 8B are time charts illustrating the rotation speed and the temperature of the catalyst 45. FIG. 8A illustrates a case where the engine 30 continues to drive, and FIG. 8B illustrates a case where the engine 30 stops according to the present embodiment. In each of FIG. 8A and FIG. 8B, the upper graph presents the rotation speed of the engine 30, and the lower graph presents the temperature of the catalyst 45.

In the case of FIG. 8A, the engine 30 does not execute the intermittent operation from time ta to time tb, and continues to drive. Thus, unburned gas burns near the catalyst 45, and thereby, the temperature of the catalyst 45 increases from approximately T1 to T2 as illustrated in the lower graph of FIG. 8A.

In the case of FIG. 8B, near time tc, the ECU 10 turns off the ISC learning flag and stops the engine 30 (steps S76 and S78) in the process of FIG. 7. As presented in the upper graph of FIG. 8B, a time period during which the engine 30 does not continue to operate and stops occurs. In other words, the engine 30 executes the intermittent operation. Accordingly, combustion deterioration and generation of unburned gas in the combustion chamber 33 are inhibited, and the combustion of the unburned gas near the catalyst 45 is also inhibited. Therefore, as presented in the lower graph of FIG. 8B, rise in temperature of the catalyst 45 is inhibited, and the temperature becomes stable near T1 after the time tc.

As described above, in the present embodiment, the ECU 10 stops the engine 30. This control inhibits the inflow of gas to the combustion chamber 33, combustion deterioration, and generation of unburned gas, and thereby, also inhibits unburned gas from burning in the catalyst 45. As a result, rise in temperature of the catalyst 45 is inhibited.

When the combustion state deteriorates and the rotation speed of the engine 30 thereby does not increase to the target rotation speed, the correction amount of the ISC learning reaches a value equal to or greater than the predetermined value, and the state where the correction amount of the ISC learning is equal to or greater than the predetermined value is maintained for a long time. The predetermined value is, for example, a value near the upper limit guard value or the upper limit guard value of the correction amount. As a result, the correction amount and the total correction amount are maintained at the upper limit, the upper limit guard control of the correction amount continues, and the learning value increases (steps S22 and S24 in FIG. 4, steps S40 and S42 in FIG. 5, and steps S52, S56, and S60 in FIG. 6). The ECU 10 sets the abnormal flag (step S16 in FIG. 3), turns off the ISC learning flag, and stops the engine 30 (steps S76 and S78 at FIG. 7). In this case, since the ISC learning is not executed, the engine 30 can stop. The ECU 10 shifts the engine 30 to the intermittent operation. As a result, rise in temperature of the catalyst 45 associated with the deterioration in combustion state is inhibited.

In addition, the freezing of the throttle valve 44 or the biting-in of a foreign object of the throttle valve 44 may make the control of the opening degree of the throttle valve 44 difficult. In this case, the correction amount and the total correction amount are maintained at the upper limit, the upper limit guard control of the correction amount continues, and the learning value increases (steps S28 and S30 in FIG. 4, steps S40 and S44 in FIG. 5, steps S54, S58, and S62 in FIG. 6). The ECU 10 sets the abnormal flag (step S16 in FIG. 3), and turns off the ISC learning flag (step S76 in FIG. 7). This control stops the ISC learning.

When EGR gas flows into the combustion chamber 33, the combustion state further deteriorates, and more unburned gas is generated. In particular, when the opening degree of the EGR valve 52 increases because of the biting-in of a foreign material of the EGR valve 52, the flow rate of EGR gas increases, and the combustion state thereby greatly deteriorates. In the present embodiment, the ECU 10 stops the engine 30, and thereby, the inflow of air and the inflow of EGR gas are reduced. Thus, generation of unburned gas is inhibited, and rise in temperature of the catalyst 45 is inhibited.

The condition D in FIG. 7 is a condition generally used as a condition for executing the ISC learning in hybrid vehicles, for example, and examples of such conditions are as follows. For example, the engine 30 has started. The ISC learning has been not completed, and it has not been determined that the ISC learning is unnecessary. The temperature of cooling water of the engine 30 is equal to or greater than a predetermined temperature. A predetermined time period has passed after the shift to low gear. The vehicle speed is equal to or less than a predetermined speed. The increase amount coefficient of fuel is less than a predetermined value. The shift lever is in a P range, the engine 30 is cold-started, or there is no history of the ISC learning. The accumulation value of the intake air amount is equal to or greater than a predetermined value. The ECU 10 may determine that the condition D is satisfied when all these conditions are satisfied, or may determine that the condition D is satisfied when one or some of the conditions are satisfied. Alternatively, another condition may be used.

In the present embodiment, the ECU 10 controls the opening degree of the throttle valve 44 by the ISC learning. The parameter may be other than the throttle opening degree. For example, a bypass passage that bypasses the throttle valve 44 is provided in the intake passage 40, and an ISC valve may be provided in the bypass passage. The ECU 10 may control the opening degree of the ISC valve, and the present embodiment can be applied to the ISC learning for adjustment of the opening degree of the ISC valve.

Although some embodiments of the present invention have been described in detail, the present invention is not limited to the specific embodiments but may be varied or changed within the scope of the present invention as claimed.

What is claimed is:

1. A control device of a hybrid vehicle powered by an internal-combustion engine and a motor, wherein
a catalyst that purifies exhaust gas is located in an exhaust passage of the internal-combustion engine, and
the control device comprises:
a learning unit configured to, during operation of the internal-combustion engine, learn a parameter for controlling a rotation speed of the internal-combustion engine so that a rotation speed of the internal-combustion engine during idling operation is equal to a target rotation speed; and
a controller configured to stop the internal-combustion engine when a state where a correction amount of the parameter to cause the rotation speed during idling operation to be equal to the target rotation speed is equal to or greater than a predetermined value continues for equal to or greater than a predetermined time period, the correction amount being obtained by learning by the learning unit, wherein
when the state where the correction amount is equal to or greater than the predetermined value continues for equal to or greater than the predetermined time period, the controller is configured to cause the internal-combustion engine to execute intermittent operation during which a stop and operation are repeated.

2. The control device according to claim 1, wherein
when the state where the correction amount is equal to or greater than the predetermined value continues for equal to or greater than the predetermined time period, the learning unit is configured not to execute the learning.

3. The control device according to claim 1, wherein the controller is configured to stop the internal-combustion engine when duration of an upper limit guard control of the correction amount is equal to or greater than the predetermined time period.

4. The control device according to claim 1, wherein a throttle valve is located in an intake passage of the internal-combustion engine, and the parameter is an opening degree of the throttle valve.

5. The control device according to claim 1, wherein the internal-combustion engine includes an EGR passage that recirculates exhaust gas from the exhaust passage to an intake passage of the internal-combustion engine.

6. A control device of a hybrid vehicle powered by an internal-combustion engine and a motor, wherein
a catalyst configured to purify exhaust gas is located in an exhaust passage of the internal-combustion engine, and the control device comprises:
a learning unit configured to, during operation of the internal-combustion engine, learn a parameter for controlling a rotation speed of the internal-combustion engine so that a rotation speed of the internal-combustion engine during idling operation is equal to a target rotation speed; and
a controller configured to stop the internal-combustion engine when a state where a correction amount of the parameter to cause the rotation speed during idling operation to be equal to the target rotation speed is equal to or greater than a predetermined value continues for equal to or greater than a predetermined time period, the correction amount being obtained by learning by the learning unit, wherein
in response to the correction amount continuing to be equal to or greater than the predetermined value for equal to or greater than the predetermined time period, the learning unit is configured stop execution of the learning.

* * * * *